US008190130B2

(12) United States Patent
Dillon

(10) Patent No.: US 8,190,130 B2
(45) Date of Patent: May 29, 2012

(54) METHOD AND SYSTEM FOR NOTIFYING A SUBSCRIBER OF EVENTS

(75) Inventor: Chesley P. Dillon, Farmington Hills, MI (US)

(73) Assignee: General Motors LLC, Detroit, MI (US)

(*) Notice: Subject to any disclaimer, the term of this patent is extended or adjusted under 35 U.S.C. 154(b) by 2067 days.

(21) Appl. No.: 10/676,211

(22) Filed: Oct. 1, 2003

(65) Prior Publication Data

US 2005/0075095 A1 Apr. 7, 2005

(51) Int. Cl.
*H04M 1/725* (2006.01)

(52) U.S. Cl. ............... 455/412.2; 455/404.2; 455/414.1; 455/414.2; 455/414.3

(58) Field of Classification Search ............... 455/412.2, 455/456, 566, 557, 456.3, 404.2, 414.1–414.3; 705/27; 709/206; 701/214; 725/141, 56
See application file for complete search history.

(56) References Cited

U.S. PATENT DOCUMENTS

| | | | | |
|---|---|---|---|---|
| 6,091,956 | A * | 7/2000 | Hollenberg | 455/456.5 |
| 2002/0029386 | A1 * | 3/2002 | Robbins | 725/56 |
| 2002/0143664 | A1 * | 10/2002 | Webb | 705/27 |
| 2003/0005466 | A1 * | 1/2003 | Liao | 725/141 |
| 2003/0208754 | A1 * | 11/2003 | Sridhar et al. | 725/34 |
| 2003/0225516 | A1 * | 12/2003 | DeKock et al. | 701/214 |
| 2004/0078436 | A1 * | 4/2004 | Demsky et al. | 709/206 |
| 2004/0082345 | A1 * | 4/2004 | Lueckhoff | 455/456.3 |

* cited by examiner

*Primary Examiner* — Wayne Cai

(57) ABSTRACT

The present invention provides a system and method for notifying a subscriber of events. A subscriber event request is received at a call center. An event activation table is created based on the received subscriber event request. The event activation table is sent to an event table storage system. A subscriber notification is sent from the event table storage system in accordance with the event activation table. A computer usable medium with suitable computer program code is employed for notifying a subscriber of events.

23 Claims, 5 Drawing Sheets

300

METHOD AND SYSTEM FOR NOTIFYING A SUBSCRIBER OF EVENTS

FIELD OF THE INVENTION

This invention relates generally to telematics systems. In particular the invention relates to a system and method of notifying a subscriber of events.

BACKGROUND OF THE INVENTION

One of the fastest growing areas of communications technology is related to automobile network solutions. The demand and potential for wireless vehicle communication, networking and diagnostic services have recently increased. Although many vehicles on the road today have limited wireless communication functions, such as unlocking a door and setting or disabling a car alarm, new vehicles offer additional wireless communication systems that help personalize comfort settings, run maintenance and diagnostic functions, place telephone calls, access call-center information, update controller systems, determine vehicle location, assist in tracking vehicle after a theft of the vehicle and provide other vehicle-related services. Drivers can call telematics call centers and receive navigational, concierge, emergency, and location services, as well as other specialized help such as locating the geographical position of a stolen vehicle and honking the horn of a vehicle when the owner cannot locate it in a large parking garage.

Information is available from a variety of sources regarding a variety of events. Managing this information and accessing the particular events of interest to a person can be time consuming. Often, a person must search for event information from several sources before locating the information they are seeking. Multimedia systems in vehicles permit access to radio stations, pre-recorded media, web sites and stored data such as stock quotes, sports scores, news, and personal reminders. A driver, interested in a traffic update, must tune to a radio station that broadcasts traffic conditions at a particular time. The driver must listen to other programming until the scheduled time for the traffic report arrives. Information on other events can require a search of various radio stations before the event is located. Access to web sites is generally not feasible while driving a vehicle and personal reminders or other information of interest may not be readily available.

It is desirable therefore, to provide a system and method for notifying a subscriber of events, that overcomes the challenges and obstacles described above.

SUMMARY OF THE INVENTION

The present invention provides a method for notifying a subscriber of events. A subscriber event request is received at a call center. An event activation table is created based on the received subscriber event request. The event activation table is sent to an event table storage system. A current notification system activity is determined. The current notification system activity is suspended for the duration of a subscriber notification and the subscriber notification is sent from the event table storage system in accordance with the event activation table. The current notification system activity is resumed upon termination of the subscriber notification.

Another aspect of the current invention provides a computer usable medium including computer program code for notifying a subscriber of events comprising: computer program code for receiving a subscriber event request at a call center, computer program code for creating an event activation table based on the received subscriber event request, computer program code for sending the event activation table to an event table storage system, and computer program code for sending a subscriber notification from the event table storage system in accordance with the event activation table. The computer usable medium further comprises: computer program code for determining a current notification system activity, computer program code for suspending the current notification system activity for the duration of the subscriber notification and computer program code for resuming the current notification system activity upon termination of the subscriber notification.

Another aspect of the current invention provides system for notifying a subscriber of events comprising: means for receiving a subscriber event request at a call center, means for creating an event activation table based on the received subscriber event request, means for sending the event activation table to an event table storage system, and means for sending a subscriber notification from the event table storage system in accordance with the event activation table. The system further comprises means for determining a current notification system activity, means for suspending the current notification system activity for the duration of the subscriber notification and means for resuming the current notification system activity upon termination of the subscriber notification.

The aforementioned and other features and advantages of the invention will become further apparent from the following detailed description of the presently preferred embodiment, read in conjunction with the accompanying drawings. The detailed description and drawings are merely illustrative of the invention rather than limiting, the scope of the invention being defined by the appended claims and equivalents thereof.

DETAILED DESCRIPTION OF THE FIGURES

Figure 1:
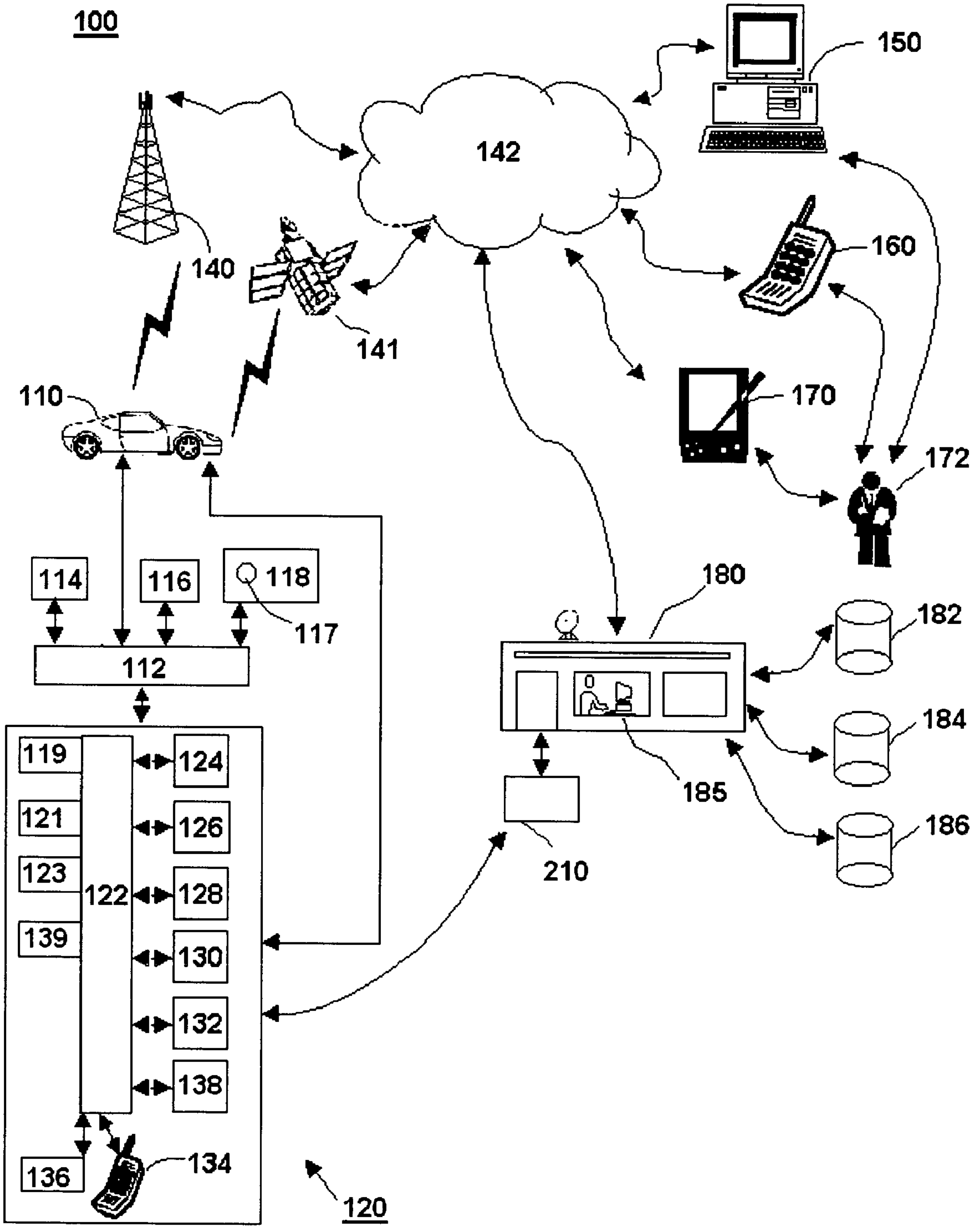
FIG. 1 is a schematic diagram of a system for notifying a subscriber of events in accordance with one embodiment of the current invention.

FIG. 1 is a schematic diagram of a system for notifying a subscriber of events in accordance with one embodiment of the current invention at 100. Subscriber notification system at 100 comprises: a mobile vehicle 110, a telematics unit 120, one or more wireless carrier systems 140, one or more satellite carrier systems 141, one or more communication networks 142, and one or more call centers 180. Mobile vehicle 110 is a vehicle, such as a car or truck, equipped with suitable hardware and software for transmitting and receiving voice and data communications.

In one embodiment of the invention, telematics unit 120 comprises an event table storage system and comprises: a digital signal processor (DSP) 122 connected to a wireless modem 124; a global positioning system (GPS) receiver or GPS unit 126; an in-vehicle memory 128; a microphone 130;

one or more speakers 132; an embedded or in-vehicle phone 134 or an email access appliance 136; a real time clock 138; a display 139; and a software monitor 123 for reading a time signal of real time clock 138. DSP 122 is also referred to as a microcontroller, controller, host processor, or vehicle communications processor. GPS unit 126 provides longitude and latitude coordinates of the vehicle, as well as a time stamp and a date stamp. In-vehicle phone 134 is an analog, digital, dual-mode, dual-band, multi-mode or multi-band cellular phone.

Telematics unit 120 is configured to store event activation tables, vehicle data upload (VDU) records, and other data files in in-vehicle memory 128. Telematics unit 120 can set or reset calling-state indicators and can enable or disable various cellular-phone, telematics-unit functions and vehicle components when directed by microcode running on DSP 122. Telematics unit 120 can send and receive over-the-air messages using, for example, a pseudo-standard air-interface function or other proprietary and non-proprietary communication links.

DSP 122 executes various computer programs and computer program code that control programming and operational modes of electronic and mechanical systems within telematics unit 120, including software monitor 123 for reading time signal of real time clock 138. DSP 122 controls communications between telematics unit 120, wireless carrier system 140 or satellite carrier system 141 and call center 180. A speech-recognition engine 119, which can translate human speech input through microphone 130 to digital signals, is installed in telematics unit 120. For example, programming of in-vehicle phone 134 is controlled with verbal commands that are translated by speech-recognition software executed by DSP 122. Alternatively, pushing buttons on an interface of telematics unit 120 or in-vehicle phone 134 is used to change a phone number or activate other functions. The interface to telematics unit 120 includes one or more buttons (not shown) on the telematics unit, radio console, or associated keyboard or keypad. In another embodiment, the interface to telematics unit 120 includes other forms of preference and data entry including touch-screens, wired or wireless keypad remotes, or other wirelessly connected devices, such as Bluetooth-enabled devices or 802.11-enabled devices.

DSP 122 controls, generates and accepts digital signals transmitted between telematics unit 120 and a vehicle communication bus 112 that is connected to various vehicle components 114, various vehicle sensors 116, and a multimedia system 118 in mobile vehicle 110. DSP 122 can activate various programming and operation modes, as well as provides for data transfers between telematics unit 120 and vehicle components 114 or multimedia system 118 and between telematics unit 120 and call center 180. Signals from DSP 122 are translated into speech messages and sent out through speaker 132 of telematics unit 120 or a speaker 117 of multimedia system 118.

Mobile vehicle 110 via telematics unit 120 sends and receives radio transmissions from wireless carrier system 140, or satellite carrier system 141. Wireless carrier system 140, or satellite carrier system 141 is any suitable system for transmitting a signal from mobile vehicle 110 to communication network 142.

Communication network 142 includes services from mobile telephone switching offices, wireless networks, public-switched telephone networks, and Internet protocol (IP) networks. Communication network 142 comprises a wired network, an optical network, a fiber network, another wireless network, or any combination thereof. Communication network 142 connects to mobile vehicle 110 via wireless carrier system 140, or satellite carrier system 141.

Communication network 142 can send and receive messages according to established protocols such as Dedicated Short Range Communications standard (DSRC), IS-637 standards for short message service (SMS), IS-136 air-interface standards for SMS, and GSM 03.40 and 09.02 standards. In one embodiment of the invention, similar to paging, an SMS communication is posted along with an intended recipient, such as a communication device in mobile vehicle 110.

Call center 180 is a location where many calls are received and serviced at the same time, or where many calls are sent at the same time. In one embodiment of the invention, the call center is a telematics call center, facilitating communications to and from telematics unit 120 in mobile vehicle 110. In another embodiment, the call center 180 is a voice call center, providing verbal communications between a communication services advisor 185 in the call center 180 and a subscriber. In another embodiment, the call center 180 contains each of these functions. In another embodiment, the call center 180 serves as a fully automated response center providing telematics service center data.

Communication services advisor 185 is a real advisor or a virtual advisor. A real advisor is a human being in verbal communication with a user or subscriber. A virtual advisor is a synthesized voice interface responding to requests from user or subscriber. In one embodiment, virtual advisor includes one or more recorded messages. In another embodiment, virtual advisor generates voice messages using a text to speech synthesis engine (TTS). In another embodiment virtual advisor includes both recorded and TTS generated messages.

Call center 180 provides services to telematics unit 120. Communication services advisor 185 provides one of a number of support services to a subscriber. Call center 180 can transmit data via data signal, such as an event or an event activation table 210, to telematics unit 120 in mobile vehicle 110 through wireless carrier system 140, satellite carrier systems 141, or communication network 142. Call center 180 creates event activation tables 210 based on subscriber event requests and can store event activation table 210 in a call center database 186. Call center 180 also has connections to a third party database 182, and a subscriber database 184. Third party database 182 is a database of events supplied by third party providers. Subscriber database 184 is a database that contains events supplied by the subscriber. Call center database 186 is a database that contains events supplied by call center 180.

Call center 180 can determine mobile identification numbers and telematics unit identifiers associated with a telematics unit access request, compare mobile identification numbers and telematics unit identifiers with a database of identifier records, and send calling-state messages to the telematics unit 120 based on the request and identification numbers.

In one embodiment of the invention, a user 172 has a local provisioning system such as a user computer 150 or a handheld device 170, such as a personal digital assistant (PDA). Local provisioning system has a wireless modem to send data through wireless carrier system 140, or satellite carrier system 141, which connects to communication network 142. In another embodiment, local provisioning system has a wired modem, which connects to communications network 142. Data is received at call center 180. Call Center 180 has any suitable hardware and software capable of providing web services to help transmit messages and data signals from local provisioning system, such as, user computer 150 or handheld device 170 to telematics unit 120 in mobile vehicle 110. In another embodiment, user computer 150 or handheld device 170 has suitable hardware and software to connect to mobile vehicle 110 using a direct link to a mobile vehicle onboard data port. In another embodiment of the invention, a user 172 uses a phone 160 to communicate with the communications network 142.

Speech recognition software is installed in telematics unit 120 and is referred to as a speech recognition engine 119. Speech recognition software is executed by DSP 122. In one embodiment, pressing a button (not shown) in vehicle 110 activates speech recognition engine 119. Pressing the button sends a signal that places the telematics unit in audio arbitration mode allowing it to respond to speech commands. A text to speech synthesizer 121 can convert text strings to audible messages that are and played through speaker 132 of telematics unit 120 or through speakers 117 of multimedia system 118.

In one embodiment of the invention event activation table 210 is transmitted to telematics unit 120 through communication network 142 and stored in memory 128 of telematics unit 120. Event activation table 210 is read by software running on DSP 122 and events are provided to subscriber in accordance with event activation table 210. Events are enunciated by text to speech synthesizer 121, through speaker 132, played through speaker 117 of multimedia system 118, or shown on display 139.

Figure 2:
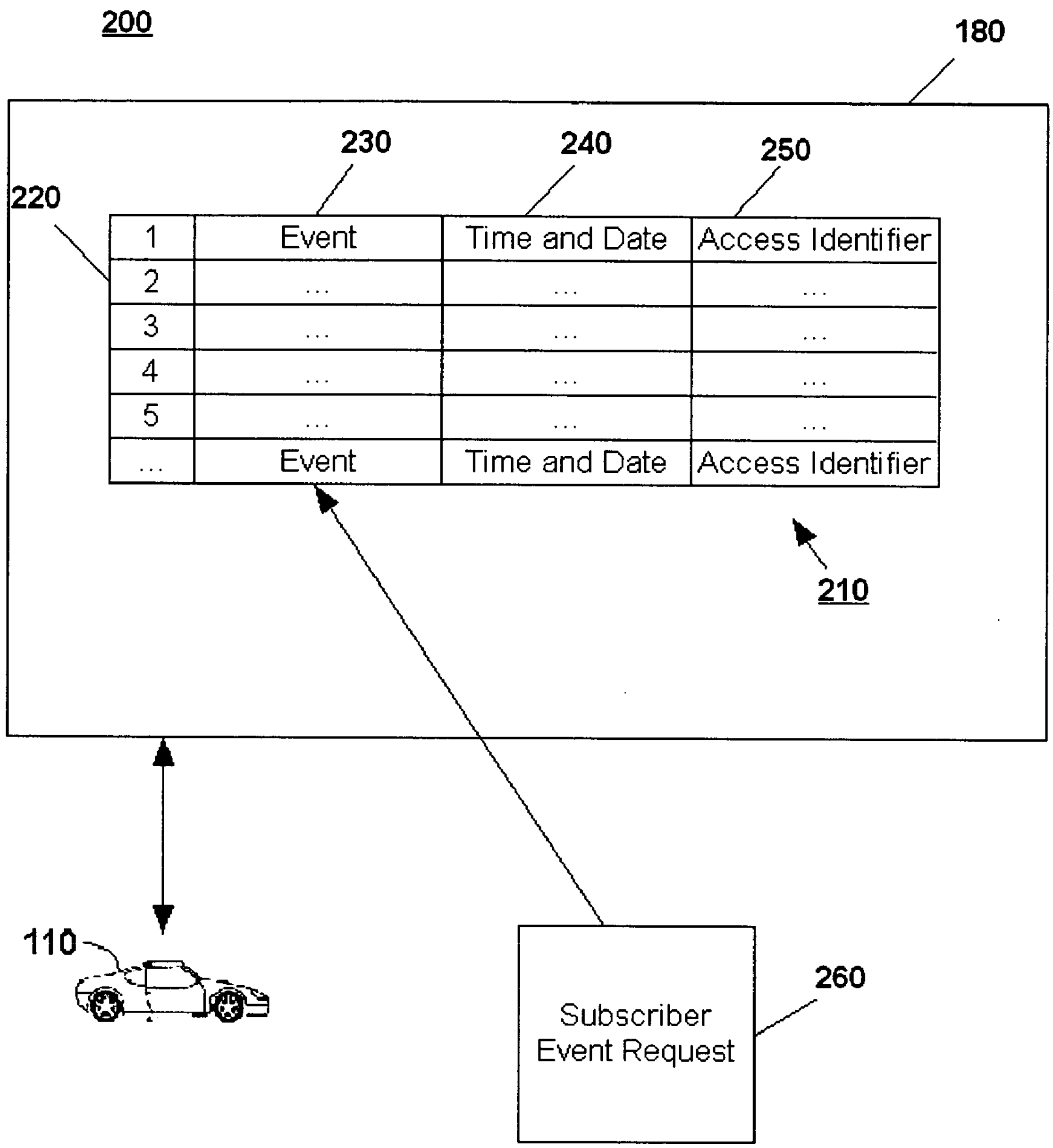
FIG. 2 is a schematic of the event activation table in accordance with one embodiment of the current invention.

FIG. 2 is a schematic of the event activation table in accordance with one embodiment of the invention at 200. Event activation table 210, is composed of at least one record 220 having an event field 230, a time and time field 240, and an access identifier field 250. The entries in the fields of each record 220 are determined from a subscriber event request 260 created by a subscriber and received at the call center 180.

The subscriber event request 260 is created when the subscriber requests events via a menu accessed within the vehicle 110. Subscriber can also create a subscriber event request 260 by requesting events via a web page or over the phone with a real or virtual advisor. A list of available events is supplied by call center 180. Subscriber can also request a non-listed event. Examples of events that a subscriber can request are: weather forecasts, traffic conditions, stock prices, sporting event scores and highlights, movie listings and show times, entertainment choices, birthdays, anniversaries, other special occasions and news reports.

After an event is requested, a text string, or event descriptor, that represents the event is written to the event field 230 of a record 220 in the event activation table 210. The event descriptor can also be text, such as sports scores or stock quotes, extracted from an event source, or a reminder message created by the subscriber. The subscriber specifies the date and time for event notification or specifies that call center 180 determines event notification date and time. The notification time and notification date is written to the date and time field 240 of the record 220 in the event activation table 210.

An access identifier linked to each event in the event activation table 210 identifies the source for that event. Examples of access identifiers are a radio frequency to tune to, a URL to index to, or database to extract from. The access identifier can also point to the event field 230 of the record 220 in the event activation table 210 when the event field 230 contains text to provide to the subscriber, such as a reminder message. The subscriber optionally includes a source for the requested event. If the subscriber does not select a source for the event, call center 180 determines the event source. The event source is written to the access identifier field 250 of the corresponding record 220 in the event activation table 210.

Once event activation table 210 is created, call center sends it to telematics unit 120 of vehicle 110. Subscriber event request 260 includes at least one event. If a requested event is unavailable, a record 220 is created in the event activation table 210 with a null event. The subscriber is then notified that the event is unavailable.

Requested events, in the event field 230 of a record 220 in the event activation table 210, are provided to the subscriber by sending a subscriber notification. The delivery date and time, in the date and time field 240 of the record 220, is the activation condition that triggers subscriber notification. The linked access identifier, in the access identifier field 250 of the corresponding record 220 identifies the source of the event and an event notification system in vehicle 110 provides the subscriber with the event. Examples of event notification systems are a text to speech synthesizer that enunciates the event, a multimedia system that broadcasts the event or a display that shows the event.

Figure 3:
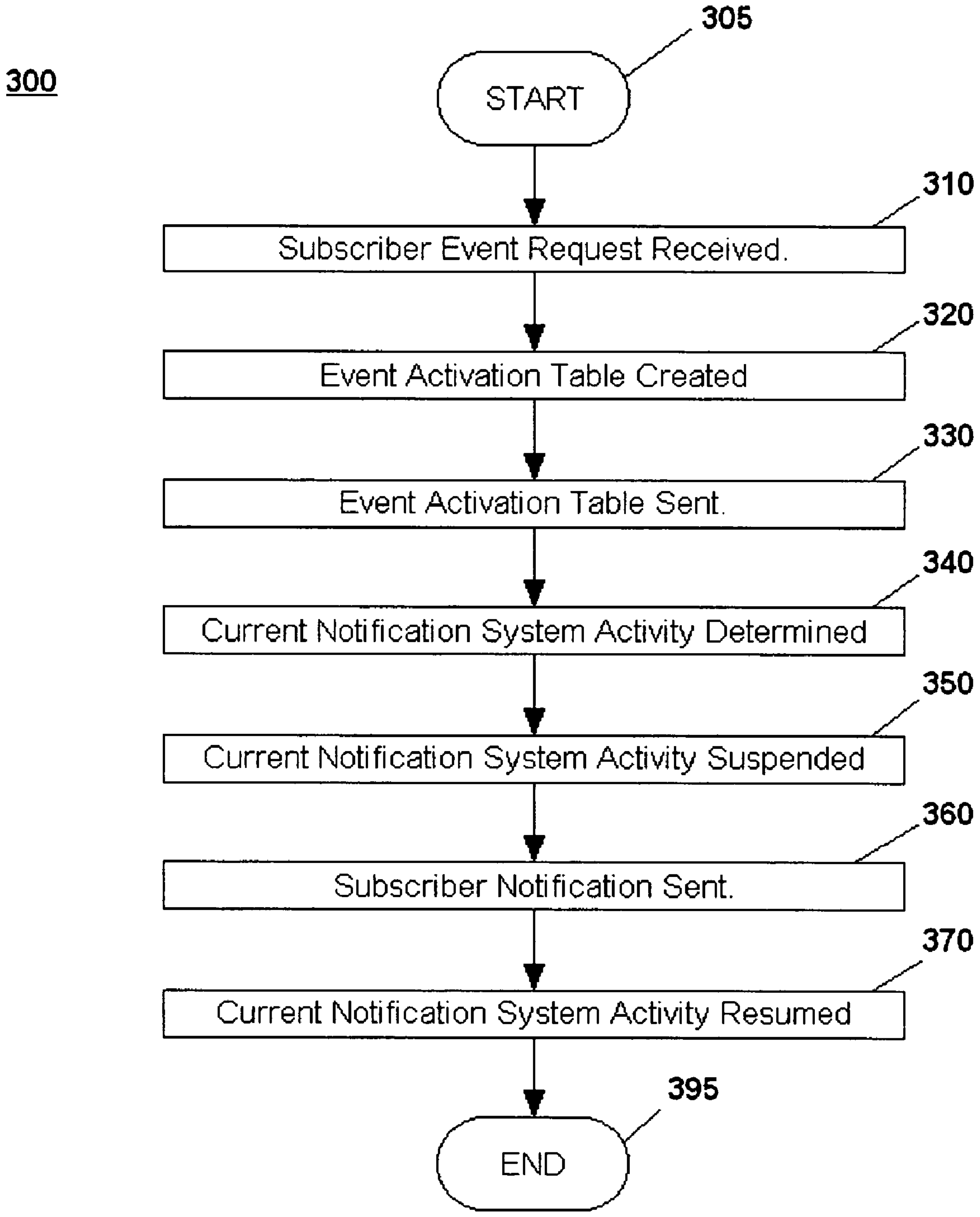
FIG. 3 is a flow diagram of a method for notifying a subscriber of events in accordance with one embodiment of the current invention.

FIG. 3 is a flow diagram of a method for notifying a subscriber of events in accordance with one embodiment of the current invention at 300. The method for notifying a subscriber of events at 300 begins (block 305) when a subscriber event request is received at a telematics call center (block 310). An event activation table is created, at the call center, based on the subscriber event request and includes a record for each requested event. The record contains the event with its associated notification date and time, and an access identifier (block 320).

Once the event activation table is created, it is sent to an event table storage system such as a telematics unit (block 330). A current notification system activity is determined (block 340) and a record of the current notification system activity is maintained in memory in the telematics unit as part of the determination. Examples of current notification system activity are the radio frequency the radio is tuned to or a CD that is playing, prior to a subscriber notification. Current notification system activity is suspended for the duration of a subscriber notification (block 350). The subscriber notification, which comprises the event, is sent in accordance with each record in the event activation table stored in the event table storage system (block 360). The current notification system activity resumes after the subscriber notification terminates (block 370) and the method ends (block 395).

Figure 4:
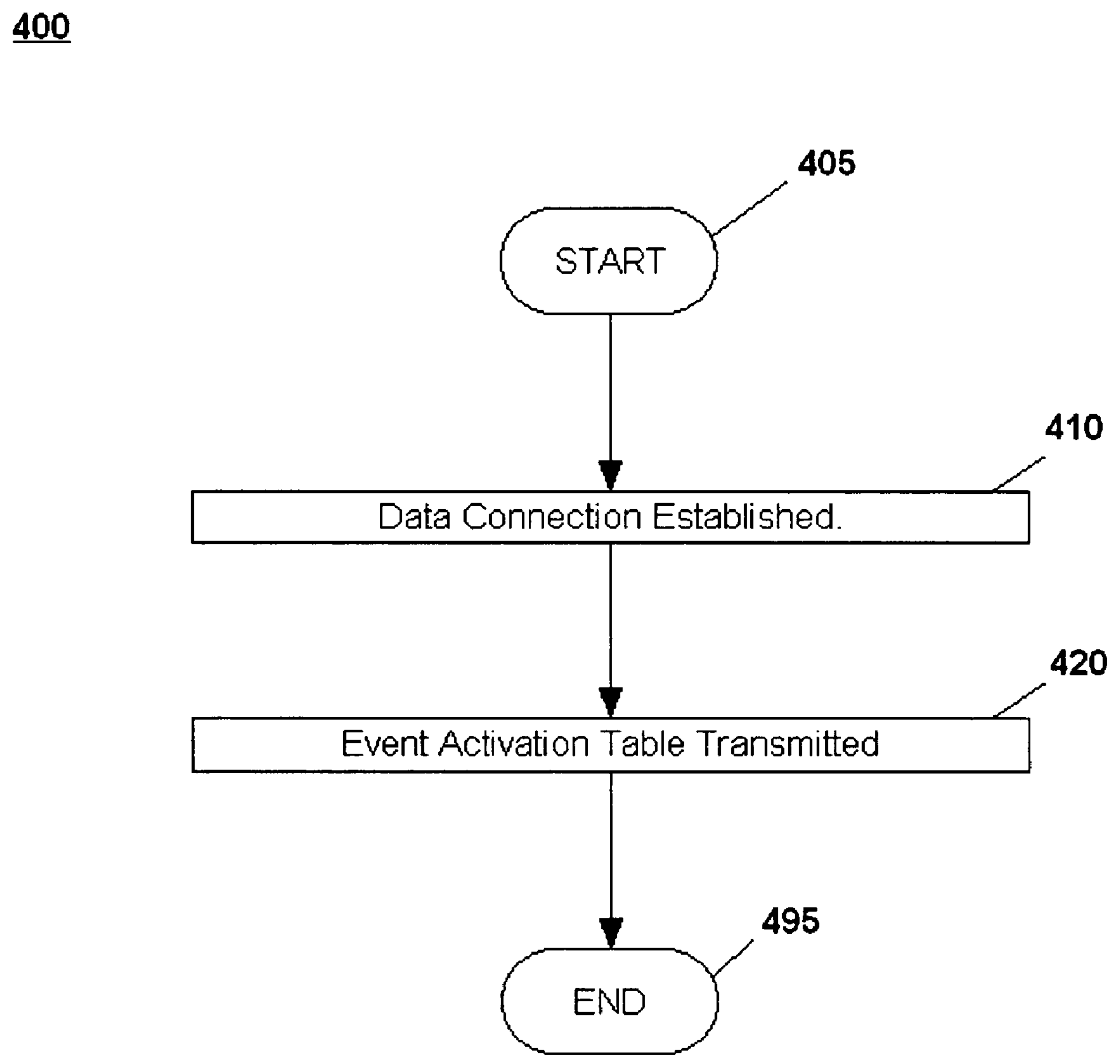
FIG. 4 is a flow diagram detailing the step of sending the event activation table at block 330 of FIG. 3.

FIG. 4 is a flow diagram detailing the step of sending the event activation table at block 330 of FIG. 3 at 400. Sending the event activation table at 400 begins (block 405) when a data connection is established between a call center and an event table storage system, such as a telematics unit (block 410). The data connection is initiated by the call center advisor, either a virtual advisor or a real advisor, by the subscriber, or by the event table storage system. The event activation table is sent when the event table storage system is active. A telematics unit is active when the ignition switch of the vehicle in which it is installed is on or when it is in the wake state of a wake/sleep cycle. Once the data connection is established, the event activation table is transmitted to the event table storage system using the data connection (block 420) and the method ends (block 495).

Figure 5:
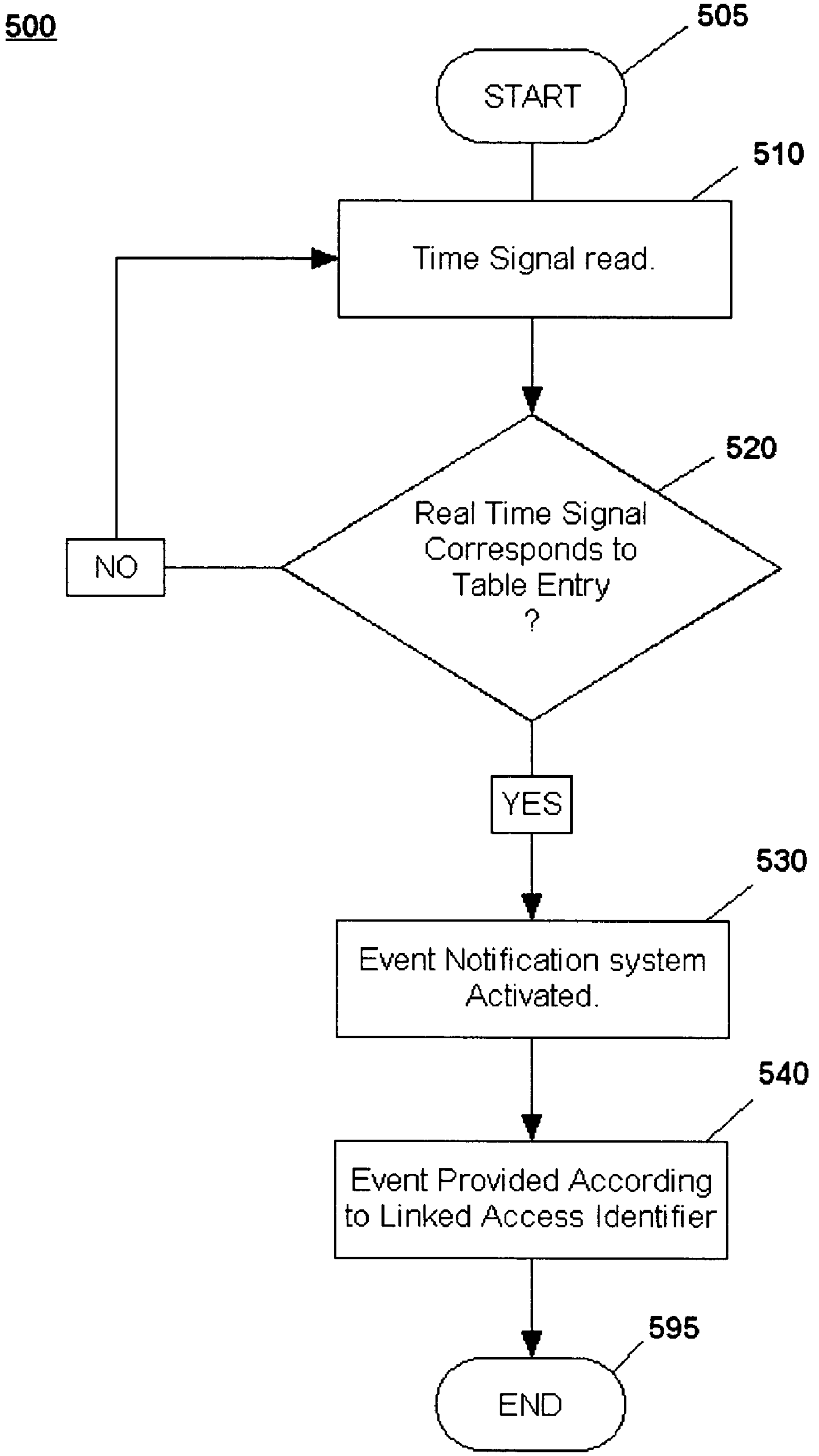
FIG. 5 is a flow diagram detailing the step of sending the subscriber notification at block 340 of FIG. 3.

FIG. 5 is a flow diagram detailing the step of sending the subscriber notification at block 340 of FIG. 3 at 500. Subscriber notification at 500 begins (block 505) when a software monitor reads a time signal (block 510). The real time clock of an event table storage system, such as a telematics unit, generates the time signal. The time signal either does or does not correspond with at least one date and time from the date and time field of a record in the event activation table (block 520). If the time signal does not correspond with at least one date and time from the date and time field of a record in the event activation table, reading the time signal repeats (block 510). If the time signal does correspond with at least one date and time from the date and time field of a record in the event activation table, an event notification system is activated (block 530). The event notification system, such as the vehicle's multimedia system or a text to speech synthesizer, provides the event to the subscriber according to the access identifier linked to the event (block 540) and the method ends (block 595). If activation of the event notification system fails, event notification system activation can repeat a predetermined number of times. If providing the event according to the linked access identifier fails, providing the event can also repeat a predetermined number of times. An alternate notification, such as a phone or an email message, is possible, if the repeated attempts at activation of the event notification system fail or the repeated attempts at providing the event fail.

One example of event notification using the in-vehicle multimedia system is when the event is traffic conditions. The event activation table would have "traffic update" in the event field, the date and time that a traffic update is available in the date and time fields, and the radio frequency of the radio station that broadcasts the traffic update in the access identifier field. In this example, the radio station, at the particular radio frequency, provides traffic updates every ten minutes. The subscriber through the subscriber event request calls for traffic updates from 0800 to 0820 every day from Monday through Friday during September. The event activation table would have multiple records for traffic updates each having a traffic update event with associated times of 0800, 0810, and 0820 and associated dates of all weekdays in September. Each of these records would have the radio frequency of the radio station in the access identifier field. When the first record's date and time corresponds to the time signal from the real time clock, the radio of the vehicle's multimedia system tunes to the specified radio frequency and the traffic update is provided to the subscriber. In this example, the subscriber can provide the radio frequency when submitting the event notification request or the call center can specify a radio frequency that satisfies the subscriber's request.

In another example, the subscriber requests an anniversary reminder on the day before the anniversary. The event activation table has a record with the phrase "remember anniversary tomorrow" in the event field, the desired notification date and time in the date and time field and "text to speech" in the access identifier field. When the event's notification date and time corresponds to the time signal from the real time clock, the text to speech synthesizer enunciates the phrase "remember anniversary tomorrow."

In a further example, the subscriber requests a stock quote for company GM at 1630 EST every Monday through Friday in September. The event activation table would have multiple records each having a stock quote event with an associated time of 1630 and an associated date of a weekday in September. Each of these records has either a database pointer or a financial website URL in the access identifier field. When the date and time of the first record corresponds to the time signal from the real time clock, the text to speech synthesizer would enunciate the stock quote, for company GM, retrieved from the appropriate database or the financial website. In this example, the subscriber can designate a source for the stock quote when submitting the subscriber event request or the call center can identify a source for the stock quote.

In an alternate embodiment of the invention, the subscriber selects an activation condition, other than a date and time, that triggers subscriber notification, such as, arriving at a particular GPS location or when a predetermined number of miles has elapsed. Supplying weather information at a location when a subscriber travels to that location is an example of using an activation condition other than a date and time. The activation condition is the GPS coordinates of the location and would replace the date and time fields on the event activation table. The event is weather and the access identifier is a radio frequency broadcasting weather information.

In another embodiment of the invention, the subscriber requests an event that does not have a known date and time, such as when band X is touring at a particular location. The subscriber event request remains at the call center until the information is available. When the information is available, an event activation table is created and sent to the telematics unit. The subscriber notification is then sent when the vehicle is subsequently started.

While embodiments of the invention disclosed herein are presently considered to be preferred, various changes and modifications can be made without departing from the spirit and scope of the invention. The scope of the invention is indicated in the appended claims, and all changes that come within the meaning and range of equivalents are intended to be embraced therein.

What is claimed is:

1. A method for notifying a subscriber of events, the method comprising:

receiving a subscriber event request at a call center wherein the call center is a telematics call center facilitating communications to and from a mobile vehicle;

creating an event activation table based on the received subscriber event request;

sending the event activation table to an event table storage system; and sending a subscriber notification including an indicator of an action associated with the event from the event table storage system in accordance with the event activation table using a wireless network to cause a notification to be conveyed to the user and to additionally cause the action to be automatically executed.

2. The method of claim 1, further comprising;

determining a current notification system activity;

suspending the current notification system activity for the duration of the subscriber notification; and resuming the current notification system activity upon termination of the subscriber notification.

3. The method of claim 1, wherein receiving the subscriber event request comprises:

receiving at least one event with an associated notification date and time.

4. The method of claim 3, wherein creating the event activation table comprises:

linking the received event and the associated notification date and time with an access identifier.

5. The method of claim 4, wherein sending the subscriber notification comprises:

reading a time signal of a real time clock;

determining when the time signal corresponds with at least one date and time from the event activation table;

activating an event notification system based on the determination; and providing the event in accordance with the linked access identifier.

6. The method of claim 1, wherein sending the event activation table to the event table storage system comprises:

establishing a data connection between the call center and the event table storage system; and transmitting the event activation table from the call center to the event table storage system using the data connection.

7. The method of claim 1, wherein the event table storage system is a telematics unit.

8. A non-transitory computer usable medium including computer program code for notifying a subscriber of events, the computer program code comprising:

computer program code for receiving a subscriber event request at a call center wherein the call center is a telematics call center facilitating communications to and from a mobile vehicle;

computer program code for creating an event activation table based on the received subscriber event requesting;

computer program code for sending the event activation table to an event table storage system; and computer program code for sending a subscriber notification including an indicator of an action associated with the event from the event table storage system in accordance with the event activation table using a wireless network to cause a notification to be conveyed to the user and to additionally cause the action to be automatically executed.

9. The non-transitory computer usable medium of claim 8, further comprising:

computer program code for determining a current notification system activity;

computer program code for suspending the current notification system activity for the duration of the subscriber notification; and computer program code for resuming the current notification system activity upon termination of the subscriber notification.

10. The non-transitory computer usable medium of claim 8, wherein the computer program code for receiving the subscriber event request comprises: computer program code for receiving at least one event with an associated notification date and time.

11. The non-transitory of claim 10, wherein the computer program code for creating the event activation table comprises: computer program code for linking the received event and the associated notification date and time with an access identifier.

12. The non-transitory computer usable medium of claim 11, wherein the computer program code for sending the subscriber notification comprises:

computer program code for reading a time signal of a real time clock; computer program code for determining when the real rime signal corresponds with at least one dam and time from the event activation table;

computer program code for activating an event notification system based on the determination; and computer program code providing the event in accordance with the linked access identifier.

13. The non-transitory computer usable medium of claim 8, wherein the completer program code for sending the event activation table to the event table storage system comprises:

computer program code for establishing a data connection between the call center and the event table storage system; and computer program code for transmitting the event activation table from the call center to the event table storage system using the dam connection.

14. A system for notifying a subscriber of events, the system comprising:

means for receiving a subscriber event request at a call center wherein the call center is a telematics call center facilitating communications to and from a mobile vehicle:

means for creating an event activation table based on the received subscriber event request;

means for sending the event activation table to an event table storage system, and means for sending a subscriber notification including an indicator of an action associated with the event from the event table storage system in accordance with the event activation table using a wireless network to cause a notification to be conveyed to the user and to additionally cause the action to be automatically executed.

15. The system of claim 14, further comprising;

means for determining a current notification system activity;

means for suspending the current notification system activity for the duration of the subscriber notification; and means for resuming the current notification system activity upon termination of the subscriber notification.

16. The system of claim 14, wherein the means for receiving the subscriber event request comprises; means for receiving at least one event with an associated notification date and time.

17. The system of claim 16, wherein the means for creating the event activation table comprises: means for linking the received event and the associated notification date and time with an access identifier.

18. The system of claim 17, wherein the means for sending the subscriber notification comprises:

means for reading a time signal of a real time clock;

means for determining when the real time signal corresponds with at least one date and time from the event activation table;

means for activating an event notification system based on the determination; and means providing the event in accordance with the linked access identifier.

19. The system of claim 14, wherein the event table storage system is a telematics unit.

20. The system of claim 14, wherein the event notification system is a multimedia system.

21. A method of notifying a subscriber of events, the method comprising:

receiving, from a subscriber at a call center facilitating communications to and from a mobile vehicle, at least one event and at least one action associated with the event;

determining the event; and transmitting a notification to the subscriber using a wireless network, the notification including instructions to automatically perform the action.

22. The method of claim 21 wherein the event is a traffic update at a predetermined time and the action includes tuning a radio receiver to a predetermined station.

23. The method of claim 21 wherein the event is a stock quote for a predetermined stock at a predetermined time, and wherein the action includes retrieving a stock quote for the predetermined stock at the predetermined time and providing the stock quote to the subscriber within a mobile vehicle using a text to speech synthesizer.

* * * * *